Sept. 22, 1925.
E. KENNEDY
TEST FITTING FOR PLUMBING SYSTEMS
Filed July 28, 1923
1,554,856
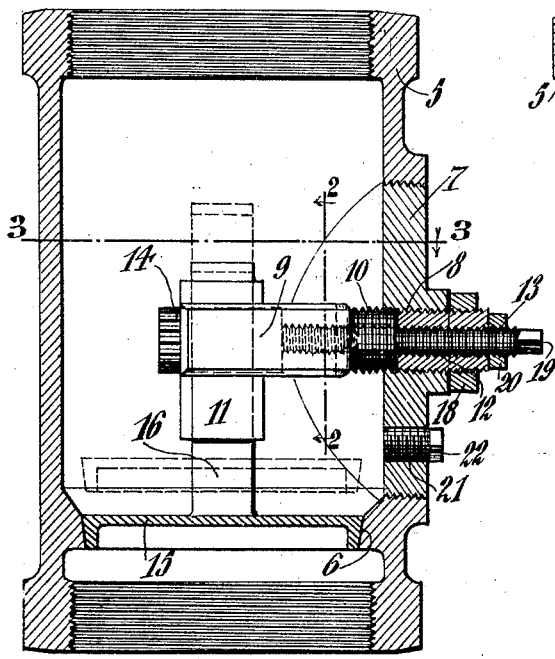
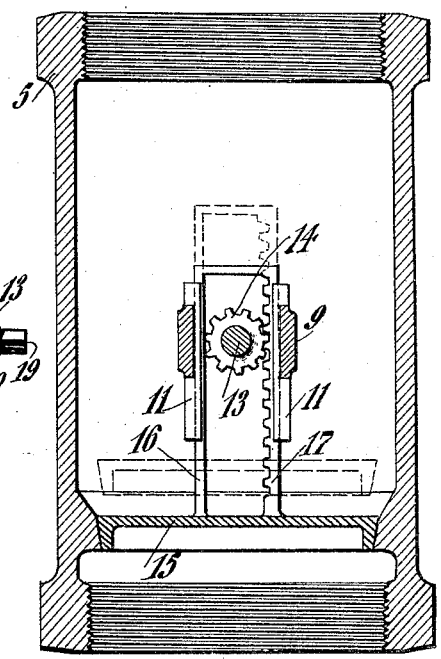
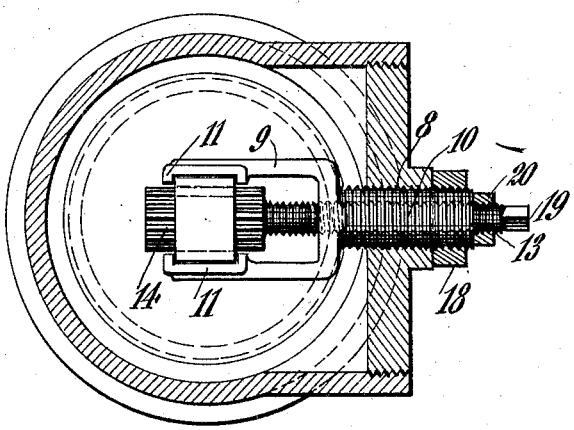
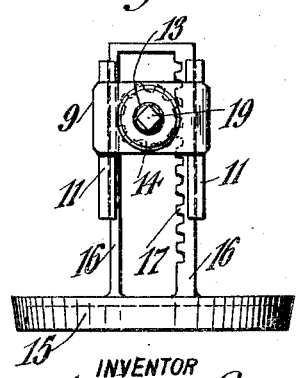
INVENTOR
Edward Kennedy
BY
ATTORNEY.

Patented Sept. 22, 1925.

1,554,856

UNITED STATES PATENT OFFICE.

EDWARD KENNEDY, OF NEW YORK, N. Y.

TEST FITTING FOR PLUMBING SYSTEMS.

Application filed July 28, 1923. Serial No. 654,305.

*To all whom it may concern:*

Be it known that I, EDWARD KENNEDY, a citizen of the United States, and a resident of the city, county, and State of New York, have invented certain new and useful Improvements in Test Fittings for Plumbing Systems, of which the following is a specification.

This invention relates to test fittings for plumbing systems and has for its primary object to provide a device of this character which may be readily inserted at any desired point in the pipe line for closing communication between the two parts of the line and operable from the exterior to open such communication and thereby permit of the free flow of water through the system.

In one embodiment of my present improvements, I provide a coupling or connecting member between the pipe sections having an internal tapered seat upon which a valve is adapted to engage, and manually operable means mounted in one side of the pipe connection for lifting the valve from its seat and supporting the same in open position against the pressure of water flowing through said pipe connection.

It is another object of my present improvements to provide a device for the above purpose which consists of relatively few parts of simple and durable construction and may be readily installed at any desired location in the plumbing system.

With the above and other objects in view, the invention consists in the improved test fitting, and in the form, construction and relative arrangement of its several parts as will be hereinafter more fully described, illustrated in the accompanying drawings and subsequently incorporated in the subjoined claims.

In the drawing wherein I have illustrated one simple and practical embodiment of the invention and in which similar reference characters designate corresponding parts throughout the several views:

Figure 1 is a longitudinal sectional view through the test fitting, the valve being shown in full lines in closed position and in dotted lines in open position;

Figure 2 is a sectional view taken on the line 2—2 of Figure 1;

Figure 3 is a section taken on the line 3—3 of Figure 1; and

Figure 4 is a detail elevation of the movable valve and operating means therefor.

In the illustrated form of my invention, I have shown the several parts as applied in connection with a suitable coupling sleeve 5 internally threaded at its opposite ends to receive the threaded ends of spaced pipe sections between which the fitting is arranged. Adjacent to one of its ends, this coupling sleeve is also provided with an internal tapered valve seat 6 the diameter of which is appreciably less than the internal diameter of the sleeve.

A hand hole or opening is provided in the wall of the sleeve 5 at one side thereof and is closed by means of the disc or plate 7, said closure plate having a central threaded opening 8 therein.

A horizontally positioned yoke 9 is provided with an externally threaded stem 10 engaged in the opening 8, said yoke 9 being located within the coupling sleeve 5 and having a vertically disposed guide 11 formed upon each arm thereof. The stem 10 is also provided with an internally threaded bore 12 in which the threaded rod or shaft 13 of a pinion 14 is engaged. This pinion extends between the vertical spaced portions 16 of an arm formed upon the valve member 15 which has a tapered peripheral face for frictional engagement upon the valve seat 6. One of the vertical portions 16 of the valve arm is formed with rack teeth 17 and with these teeth the pinion 14 is engaged, said spaced portions of the arm being slidable in the guides 11.

The outer end of the threaded stem 9 projects beyond the closure plate or disc 7 and is adapted to receive a lock nut 18 whereby said stem and the frame 9 are rigidly held against turning or rotative movement. The threaded rod or shaft 13 of the pinion 14 also projects beyond the end of the stem 10 and terminates in a square or rectangular portion 19 adapted to be engaged by a suitable wrench or crank socket whereby said shaft or rod may be conveniently turned. A lock nut 20 is also threaded upon the external end of the shaft 13 for engagement against the end of the threaded stem 10.

In testing the plumbing system, the valve 15 is moved to its closed position in tight engagement upon the tapering seat 6 so that the flow of water is cut off from the lower part of the system and heavy pressure is built up in the upper portion thereof. Owing to this heavy pressure, any leaks may be readily located. After inspection, the shaft 13 is rotated so that the pinion 14 coacting with the rack teeth 17 will lift the valve from its seat to the dotted line position shown in Figure 1, thus releasing the water so that it may freely flow through the entire system. By the use of the tapering valve and seat in lieu of a threaded plug or closure as heretofore employed, the rapid movement of the valve to its open position upon rotation of the shaft 13 is assured, even though the valve may have remained in its closed position in contact on the tapering seat for a considerable length of time. Owing to the threaded connection of the shaft 13 with the sleeve 10, the valve will be retained in its raised open position against the pressure of the water acting upon the upper surface of the valve. It will be understood of course, that in the rotation of this shaft 13, it moves longitudinally through the stem 10, but in view of the elongated form of the pinion 14, the pinion teeth will always remain in mesh with the teeth of the rack 17.

The disc or closure plate 7 for the hand opening of the sleeve 5 may also be provided with an additional threaded opening 21 so that a pipe can be connected therewith to drain or carry off the water above the valve 15 when it is desired to decrease the water pressure without opening the valve or to supply water above the valve, or to supply water above the valve in the testing of the system. This opening 21 is normally closed by a suitable threaded plug 22.

From the foregoing description considered in connection with the accompanying drawing, the construction, manner of operation and several advantages of the device will be readily understood. The improved test fitting includes comparatively few parts of simple construction. While the arrangement which I have herein referred to is deemed preferable, it will nevertheless be understood that the present invention broadly comprehends various equivalent devices of this character wherein the movable valve member is actuated by a manually operable means extending exteriorly of the pipe connection or sleeve. It is also apparent that though I have shown the valve as arranged in the lower end of the coupling sleeve, said valve might also be arranged in the upper end portion thereof. After the system has been tested the shaft 13 is rotated to lift the valve from its seat and the plate 7 is then removed from the hand hole and unthreaded from the stem 10. The valve and its operating means may now be readily withdrawn through the hand hole in the wall of the sleeve 5, after which said hand hole is closed by the plate and the opening in said plate closed by a suitable plug.

While I have herein shown and described the preferred form, construction and arrangement of the several elements, it will nevertheless be understood that various structural modifications thereof might be adopted without affecting the principle involved, and I, therefore reserve the privilege of adopting all such legitimate changes as may be fairly embodied within the spirit and scope of the invention as claimed.

I claim:

1. In a test fitting for plumbing systems, a cylindrical casing member having an internal valve seat adjacent to one of its ends and a hand hole in its side wall, a closure plate for said hand hole provided with a central threaded aperture through it, a plug positioned in the threaded aperture in said plate having inwardly extending guide members on the inner side of the plate, a valve adapted to engage said valve seat, a rearwardly extending arm on said valve slidingly mounted in the guide members on said plug, a lock nut on the upper end of said plug for holding the same in a position whereby said valve will properly cooperate with the valve seat in said casing, and means for moving the valve into and out of engagement with said valve seat, and further means for maintaining the valve in or out of engagement with said valve seat.

2. In a test fitting for plumbing systems, a casing member comprising a cylindrical sleeve having an internal valve seat adjacent to one of its ends and a hand hole in its side wall, a closure plate for said hand hole provided with a central threaded aperture through it, a plug positioned in the threaded aperture in said plate having inwardly extending guide members on the inner side of the plate and a concentric threaded bore through said plug, a valve adapted to engage said valve seat, a rearwardly extending arm on said valve slidingly mounted in the guide members on said plug whereby the valve member is carried by the closure plate for removal from the casing member as a unit, a lock nut on the upper end of said plug for holding the same in a position whereby said valve will cooperate with the valve seat in the casing, a threaded valve operating rod extending through the bore in said plug, and means on the inner end of said rod engaging the arm on the valve for moving the valve into and out of engagement with said valve seat.

3. In a test fitting for plumbing systems, a casing member comprising a cylindrical sleeve having an internal valve seat adjacent to one of its ends and a hand hole in its side wall, a closure plate for said hand hole, inwardly extending guide members on the inner side of the plate and a central threaded bore extending through the plate between the guide members, a valve adapted to engage said valve seat, a rearwardly extending arm on said valve slidingly mounted in the guide members whereby the valve member is carried by the closure plate for removal from the casing member as a unit, a threaded valve operating rod extending through said central bore, means on the inner end of said rod engaging the arm on the valve for moving the valve into and out of engagement with said valve seat, and a lock nut on the upper end of said rod locked for maintaining the valve in open or closed positions.

In testimony that I claim the foregoing as my invention, I have signed my name hereunder.

EDWARD KENNEDY.